(12) United States Patent
Ouchi (10) Patent No.: US 7,428,691 B2
(45) Date of Patent: Sep. 23, 2008

(54) DATA RECOVERY FROM MULTIPLE FAILED DATA BLOCKS AND STORAGE UNITS

(76) Inventor: Norman Ken Ouchi, P.O. Box 20111, San Jose, CA (US) 95160

( * ) Notice: Subject to any disclaimer, the term of this patent is extended or adjusted under 35 U.S.C. 154(b) by 1057 days.

(21) Appl. No.: 10/706,881

(22) Filed: Nov. 12, 2003

(65) Prior Publication Data

US 2005/0114726 A1    May 26, 2005

(51) Int. Cl.
*G11C 29/00* (2006.01)
(52) U.S. Cl. ...................... 714/770; 711/162
(58) Field of Classification Search ............. 714/763, 714/773, 769–771; 711/162
See application file for complete search history.

(56) References Cited

U.S. PATENT DOCUMENTS

| | | | |
|---|---|---|---|
| 4,092,732 A | 5/1978 | Ouchi | 714/5 |
| 4,761,785 A | 8/1988 | Clarke et al. | 714/805 |
| 4,870,643 A | 9/1989 | Bultman | 714/7 |
| 4,914,656 A | 4/1990 | Dunphy et al. | 714/710 |
| 4,989,206 A | 1/1991 | Dunphy et al. | 714/7 |
| RE34,100 E | 10/1992 | Hartness | 714/769 |
| 5,208,813 A | 5/1993 | Stallmo | 714/7 |
| 5,265,098 A | 11/1993 | Mattson et al. | 714/6 |
| 5,271,012 A | 12/1993 | Blaum et al. | 714/6 |
| 5,278,838 A | 1/1994 | Ng et al. | 714/6 |
| 5,305,326 A | 4/1994 | Solomon et al. | 714/6 |
| 5,333,143 A | 7/1994 | Blaum et al. | 714/766 |
| 5,371,743 A | 12/1994 | De Yesso | 714/10 |
| 5,390,187 A | 2/1995 | Stallmo | 714/7 |
| 5,522,031 A | 5/1996 | Ellis et al. | 714/6 |
| 5,579,475 A | 11/1996 | Blaum et al. | 714/6 |
| 5,581,690 A | 12/1996 | Ellis et al. | 714/6 |
| 5,596,709 A | 1/1997 | Bond et al. | 714/7 |
| 5,613,059 A | 3/1997 | Stallmo et al. | 714/6 |
| 5,621,882 A | 4/1997 | Kakuta | 714/6 |
| 5,657,439 A | 8/1997 | Jones et al. | 714/7 |
| 5,657,468 A | 8/1997 | Stallmo et al. | 711/114 |
| 5,848,230 A | 12/1998 | Walker | 714/7 |
| 5,917,999 A | 6/1999 | Yamamoto et al. | 714/6 |

(Continued)

OTHER PUBLICATIONS

Alvarez et al. 'Declustered disk array architectures with optimal and near-optimal parrallelism,' Computer Architecture, 1998. Proceedings. The 25th Annual International Symposium on; Jun. 27-Jul. 1, 1998 pp. 109-120.*

(Continued)

*Primary Examiner*—Guy J Lamarre (57) ABSTRACT

In the past, storage unit (disk drive) failures were the primary cause of data loss in a storage system. With higher unit reliability and higher bit density, random bit errors have become the primary cause of data loss. Most data recovery mechanisms treat reconstruction of redundant information on the same level as data reconstruction. In reality, data reconstruction is more important and asymmetry between data protection and redundant information protection provides trade-offs of data recoverability against performance. The present invention provides data recovery from both a first number of data block failures due to random bit failures and a second number of storage unit failures while providing update write performance equivalent to data protection mechanisms with lower data recovery capabilities. The level protection from number of data block failures, the number of unit failures, and update write performance are parameterized to select a desired combination.

18 Claims, 5 Drawing Sheets

U.S. PATENT DOCUMENTS

| | | | |
|---|---|---|---|
| 5,941,994 A | 8/1999 | DeKoning et al. | 714/7 |
| 5,959,860 A | 9/1999 | Styczinski | 700/12 |
| 6,029,254 A | 2/2000 | Andrews | 714/6 |
| 6,049,890 A | 4/2000 | Kakuta et al. | 714/6 |
| 6,052,759 A | 4/2000 | Stallmo et al. | 711/114 |
| RE36,846 E | 8/2000 | Ng et al. | 714/6 |
| 6,145,091 A | 11/2000 | Yamamoto et al. | 714/6 |
| 6,154,854 A | 11/2000 | Stallmo | 714/6 |
| 6,161,165 A | 12/2000 | Solomon | 711/114 |
| 6,243,824 B1 | 6/2001 | Kakuta et al. | 714/3 |
| 6,256,749 B1 | 7/2001 | Kakuta et al. | 714/6 |
| 6,289,471 B1 | 9/2001 | Gordon | 714/6 |
| 6,317,844 B1 | 11/2001 | Kleiman | 714/6 |
| 6,327,673 B1 | 12/2001 | Yamamoto et al. | 714/6 |
| 6,418,539 B1 | 7/2002 | Walker | 714/5 |
| 6,427,212 B1 | 7/2002 | Frey et al. | 714/6 |
| 6,532,549 B2 | 3/2003 | Yamamoto et al. | 714/6 |
| 6,675,318 B1 * | 1/2004 | Lee | 714/6 |

OTHER PUBLICATIONS

A Case for Redundant Arrays of Inexpensive Disks (RAID), by D. Patterson, G. Gibson, and R. H. Kartz, Report No. UCB/CSD 87/391, Dec. 1987, Computer Science Division, U. of California, Berkeley.
B-Adjacent coding was first disclosed and claimed by Arvind Patel, U.S. Pat. No. 3,745,528, "Error Correction for Two Tracks in a Multitrack System", issued Jul. 10, 1973.

* cited by examiner

PRIOR ART

Figure 1

PRIOR ART

Figure 2

PRIOR ART

Figure 3

PRIOR ART

DATA RECOVERY FROM MULTIPLE FAILED DATA BLOCKS AND STORAGE UNITS

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention is related to fault tolerant storage systems that provide recovery of data when major elements of the storage system have failed.

BRIEF SUMMARY OF THE INVENTION

In the present invention a data recovery mechanism used to recover data from failed storage units is used to recover data from failed blocks on storage units.

To reduce the impact of the read and write operations, multiple redundant blocks are stored on a storage unit. The storage for redundant blocks is rotated among the storage units so that the block storage requirements are balanced. Rotating the redundant block storage among the storage devices may also balance the storage system accesses.

To recover data when the storage units with the redundant blocks fail, redundant blocks are stored with the latest data block update to reduce the impact of writing the redundant blocks. A redundant block may be a copy of a redundant block to protect against storage unit failures or may be a redundant block generated from blocks on the storage unit using a second error correction code and second stripe structure within the storage unit.

BACKGROUND OF THE INVENTION

Figure 1:
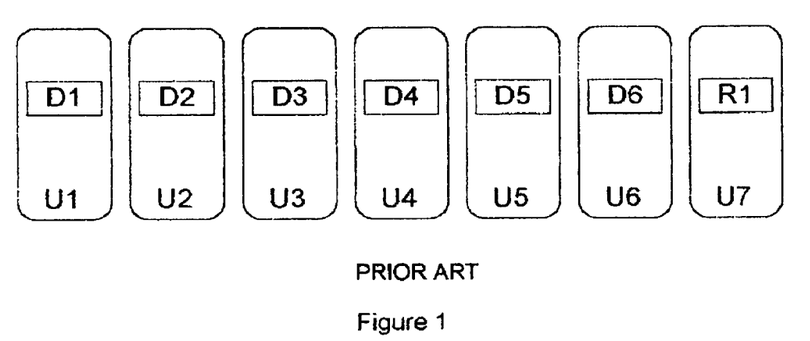
FIG. 1 illustrates a storage system with six data blocks stored on six storage units and a redundant block stored on a seventh storage unit where the redundant data block is used to reconstruct a failed data block per stripe and can be used to reconstruct a failed storage unit.

Disk storage is the primary storage medium for most systems. Systems operate in real time 24×7. Loss of data on a disk drive can cause the system to fail and may have significant non-recoverable impact on the functions supported by the system. Disk drive failures were the primary cause of loss of data. Ouchi, U.S. Pat. No. 4,092,732, disclosed recovery of data from N storage units and a redundant storage unit such that if any one of the storage units fail, the data on the failed storage unit can be reconstructed from the remaining N−1 storage units and the redundant storage unit. The data in the storage units are divided into addressable blocks. FIG. 1 illustrates data block D1 stored on storage unit U1, data block D2 stored on storage unit U2, etc. The redundant block R1 is derived from D1, D2, D3, D4, D5, and D6 such that a block can be reconstructed from the remaining N−1 blocks and the redundant block. The redundant block R1 is stored on storage unit 7. The set of blocks: D1, D2 D3, D4, D5, D6, and R1 is called a stripe. A stripe is updated by generating R1 for the stripe and writing all of the blocks.

A data block is updated by
1. Reading the old data block on the storage unit with the data block,
2. Reading the redundant block on the storage unit with redundant block,
3. Removing the effect of the old data block from the redundant block and adding the effect of the new data block to the redundant block
4. Writing the updated redundant block on the storage unit with the redundant block
5. Writing the new data block on the storage unit with the data block.

For disk drive storage units, a data block update requires two disk drive reads and two disk drive writes and the two disk drives are busy (not available for other operations) for the duration of the operations. Many innovative people have worked to speed-up, hide, or otherwise try to minimize the impact of these disk drive reads and writes. However, two reads and two writes are required to update a data block.

Figure 2:
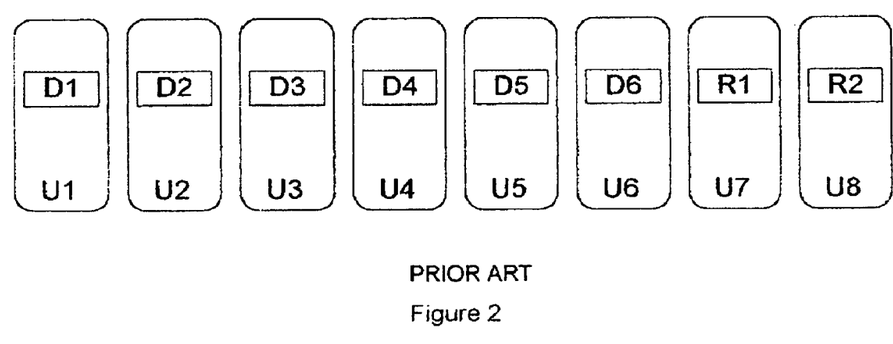
FIG. 2 illustrates a storage system with six data blocks stored on six storage units and a first redundant block stored on a seventh storage unit and a second redundant block is stored on an eighth storage unit where the redundant data blocks are used to reconstruct two failed data blocks per stripe and can be used to reconstruct two failed storage units.

While the probability of the loss of a disk drive is small, there is concern that there may be the loss of a second disk drive while the storage system is recovering from the loss of the first disk drive. Blaum, et al, U.S. Pat. No. 5,271,012, disclosed the use of multiple parity domains to protect against the loss of a second disk drive by providing for the reconstruction of two blocks. Blaum and Ouchi, U.S. Pat. No. 5,333,143, disclosed the use of an algebraic code called b-adjacent code from Patel, U.S. Pat. No. 3,745,528, to protect against the loss of a second disk drive. The b-adjacent code generates two redundant blocks from N data blocks to protect against two block failures within a stripe. The two redundant blocks are stored on an N+1th disk drive and an N+2th disk drive. FIG. 2 illustrates data block D1 stored on storage unit U1, etc. Redundant block R1 and redundant block R2 are derived from data blocks D1, D2, etc. Redundant block R1 is stored on storage unit U7 and redundant block R2 is stored on storage unit U8.

A data block update requires three disk drive reads and three disk drive write operations and the three disk drives are busy There are the four operations for the single block protection plus the read and write operations on the second redundant disk drive to process the second redundant block. The b-adjacent code can be constructed to protect against any given number of block failures; a redundant block is required for each block failure to be protected. For example, four-block failures can be protected with the generation of four redundant blocks; five-block failures can be protected with the generation of five redundant blocks, etc. However, to update a data block with four-block failure protection with the redundant blocks stored on four disk drives requires five read operations and five write operations and five busy disk drives.

Figure 3:
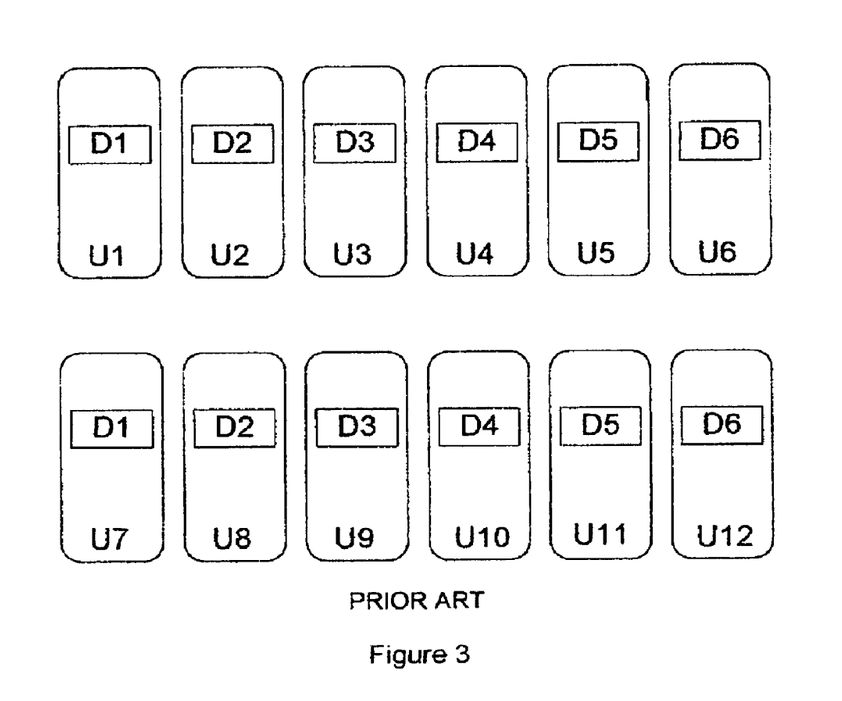
FIG. 3 illustrates a mirrored storage system with six data blocks stored on twelve storage units where a redundant mirrored data block is used to reconstruct a failed data block pr failed storage unit.

Another mechanism to protect against loss of a block or storage unit is "mirroring", duplicate images of the data blocks. FIG. 3 illustrates a mirrored storage array for data blocks D1, D2, D3, D4, D5, and D6. Data block D1 is stored on storage units U1 and U7, D2 on U2 and U8, etc. Mirroring provides for recovery from the loss of one storage unit and many combinations of loss of multiple storage units. In fact, half of the storage units can fail as long as two do not store the same data block. For example, storage units U7, U8, U9, U10, U11, and U12 can fail and the storage system still can access all data blocks. However, loss of U1 and U7 loses D1 and disables the storage system. Mirroring protects against all single storage unit failures and most double storage unit failures. Data block update only requires two writes, one each on the two storage units with the data block storage.

Figure 4:
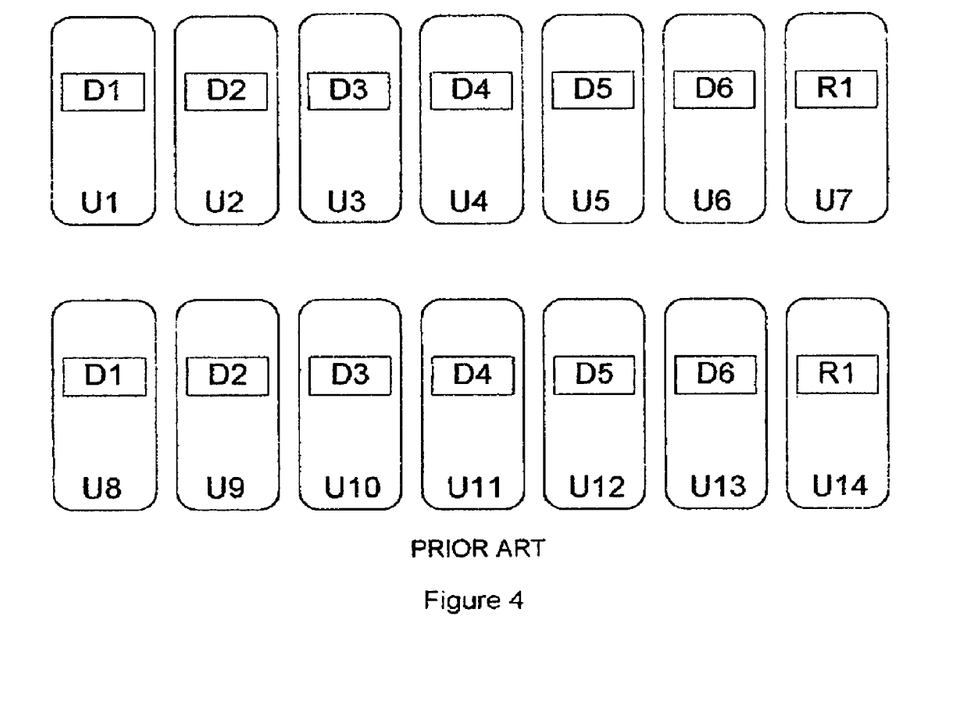
FIG. 4 illustrates a mirrored single block protected storage system with six data blocks stored on twelve storage units and a redundant block stored on two storage units where a redundant data block or redundant mirrored data block is used to reconstruct a failed data block or a data block is reconstructed using the data blocks and redundant block on remaining storage units when both a data block and its mirror is lost

A variation on mirroring is the use of two duplicate images each with single block protection as illustrated in FIG. 4. Data block D1 is stored on storage units U1 and U8, etc. The redundant block R1 is generated from data blocks D1, D2, D3, D4, D5, and D6 and stored on storage units U7 and U14.

Mirroring with single block protection provides for the loss of two drives that hold the same data block as long as the other storage units in a stripe are still operational. For example, storage units U7, U8, U9, U10, U11, U12, U13 and U14 can fail and storage unit U1 fail and the storage system is still operational. However, loss of any of two pairs (U1, U8) (U2, U9) (U3, U10) (U4, U11) (U5, U12) (U6, U13) or (U7, U14) will disable the storage system. Mirroring with single block protection protects against all combinations of three storage unit failures and most four storage unit failures. A data block update requires two sets of two read operations and two write operations.

Mirroring requires N additional storage units to protect N storage units. Mirroring with single block protection requires N+2 storage units to protect N storage units. Algebraic codes such as the b-adjacent code provide protection by adding storage for one block per block failure protected independent of the number of storage units, N. That is, one unit is added to protect against single unit failures, two units added to protect against two unit failures, etc. In spite of rapidly decreasing disk drive costs, most storage system users do not want to double the storage system capacity for mirroring except for very demanding performance requirements or small storage systems. For some storage systems, the high performance mirrored information is shadow copied to storage protected with algebraic code redundancy. Mirroring with single block protection provides significant protection. However, the number of redundant units is high compared to the units protected and the data block update overhead is equivalent to the single block protection without mirroring. The algebraic codes provide very efficient protection with a significantly smaller number of added storage units. However, the data block update overhead increases by two accesses for each additional block failure protection. Mirroring faces the same problem as a higher number block failures are protected since the added protection is provided by algebraic codes. Only the most demanding performance and availability applications can afford triple mirroring.

It is desirable to provide data protection afforded by algebraic codes for failures that do not cause the loss of a storage unit without the growth in data block update overhead as block protection is added.

DESCRIPTION OF THE INVENTION

Background

Disk drive failure continues to be the primary cause of permanent loss of access to data. Disk drive reliability continues to improve. However, disk drives have increased in capacity and data rate as the bit density on the disk surface increased. With increased bit density comes a higher error rate as the defects become larger in proportion to the smaller bit size. Disk blocks with large defects are not used for data. The file system removes these from use as they are detected. However, if a disk block was initially useable, data will be recorded and the data must be recovered. Some disk drives protect disk blocks against disk errors using error correction codes that can detect, locate and correct errors. Most disk error correction codes are designed to correct a burst error with a maximum burst length or bits in error. Burst errors are usually due to defects on the recording surface and are relatively stable. That is, the defects do not move or grow. However, with increasing bit density, the error characteristics are changing. Rather than fixed burst errors, the errors are more evenly distributed and of smaller burst size. Two wide spaced short bit errors in a disk block can make the data in the block unreadable. Adding error correction information into every disk block for multiple short errors, where most blocks do not need the correction capability, is not economical. The error correction provided by block level redundancy has been used to protect against the failure a disk drive. This mechanism can also be used to protect against the loss of a block with data due to surface errors or other factors that do not cause the loss of a disk drive. However, the error rates due to the loss of blocks without disk drive failure may be much higher than the errors due to the loss of a disk drive. With higher error rate is the possibility of multiple blocks in error. The two-block error rate can be significantly higher than the rate of two disks failing. Data recovery from multiple block errors may be used for a number of block failures and a smaller number of storage unit failures. The protection against a smaller number of storage unit failure does not reduce the storage requirement for redundant blocks but can reduce the number of read and write operations to update the data blocks.

The algebraic error correction codes require a redundant block for each block to be corrected. A single block correction code requires one redundant block to protect N blocks. A double block correction code requires two redundant blocks to protect N blocks. There is no magic that can reduce the number of redundant blocks. The prior art stores the redundant blocks on separate disk drives or storage units to protect against the loss of storage units. Since the redundant blocks are stored on separate storage units, each additional block correction capability requires a storage unit read and write operation. While these operations are performed in parallel on the affected disk drives, these drives are busy, not available for other operations, thus reducing the potential throughput of the storage system. Each disk drive operation consists of a read followed by a write. The operation starts with Moving the actuator to the track with the block, The actuator settles and waits while the disk rotates to bring the block under the read/write head, The block is read The old data block and new data block are used to process the redundant block to reflect the change in the data block.

The disk rotates until the block passes again under the read/write head

The block is written.

Disk drive actuator time and rotation time have been reduced but are still measured in milliseconds. The read or write data transfer time are measured in tens or hundreds of microseconds. Reading or writing added blocks of data will not measurably affect the time for the read and write operations.

Data Recovery from Multiple Failed Data Blocks and Storage Units

The data recovery mechanism used to recover data from failed storage units (disk drives) is used to recover data from failed blocks on storage units.

To reduce the impact of the read and write operations, multiple redundant blocks are stored on a storage unit. The storage for redundant blocks is rotated among the storage units so that the block storage requirements are balanced. Rotating the redundant block storage among the storage devices may also balance the storage system accesses as disclosed by Clarke, et al, U.S. Pat. No. 4,761,785.

To recover data when the storage units with the redundant blocks fail, redundant blocks are stored with the latest data block update to reduce the impact of writing the redundant blocks. A redundant block may be a copy of a redundant block to protect against storage unit failures or may be a redundant block generated from blocks on the storage unit using a second error correction code and second stripe structure within the storage unit.

Multiple Redundant Blocks Stored in a Storage Unit

Figure 5:
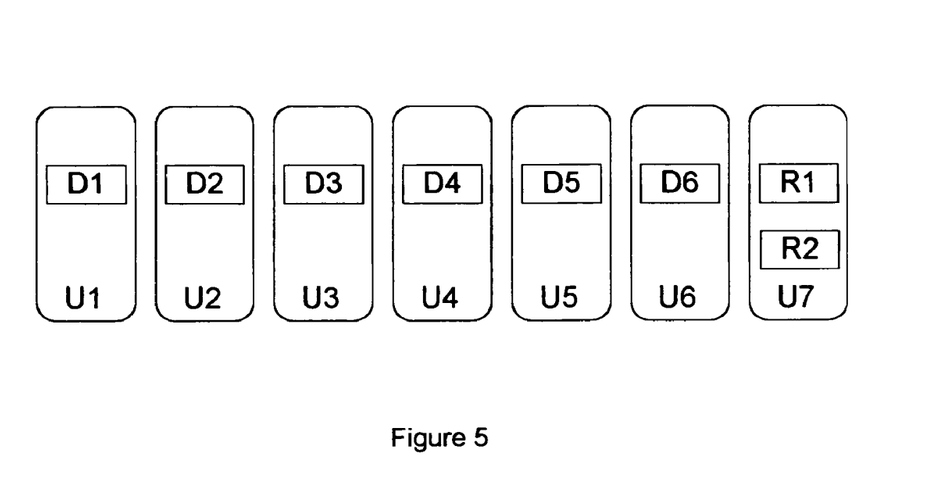
FIG. 5 illustrates a storage system with six data blocks on six storage units and two redundant blocks on a seventh storage unit where the redundant blocks are used to reconstruct up to two failed data blocks per stripe or reconstruct one failed storage unit.

FIG. 5 illustrates a storage system that provides data recovery for any two blocks or the loss of a storage unit. Data block D1 is stored on storage unit U1, D2 on U2, D3 on U3, D4 on U4, D5 on U5, and D6 on U6. An algebraic error correction code, such as the b-adjacent code, uses data blocks D1, D2, D3, D3, D5, and D6 to generate redundant blocks R1 and R2 such that any two blocks may fail and all blocks reconstructed from the remaining blocks. Redundant blocks R1 and R2 are stored on storage unit U7. A data block is updated with two read and two write operations. For example, D4 is to be updated. D4 is read from U4 and R1 and R2 are read from U7. The old data from D4 is used to remove the effect of the old D4 data from R1 and R2 and the new data for D4 is used to add the effect of new D4 data to R1 and R2. The new D4 is written to U4 and the updated R1 and R2 are written to U7. The time for the read and write operations that operate on two blocks on U7 is not significantly different from the time for a one block operation. The throughput is very similar to that for a single block protection storage subsystem. The storage capacity requirement is increased by one block per stripe or the equivalent of one storage unit to store the second redundant block. The data capacity for each storage unit in a seven storage unit system is reduced by ⅛ or ⅞ the original capacity. The impact of a storage unit failure is not symmetric in that the loss of U7 leaves the storage system without any redundancy. A loss of an additional data block in the stripe will cause an unrecoverable error. If the redundancy rotates among the storage units, the loss of any storage unit exposes 1/(N+1) or ⅐ of the blocks to potential unrecoverable error. Note that this is no worse than the single block protection for most current storage systems. However, the storage system protection strategy was based on protecting blocks in a higher block error rate environment and data recovery when the unit with the redundant block has failed can be provided.

Copy of Redundant Block Stored on Storage Unit with Latest Data Block Update

Figure 6:
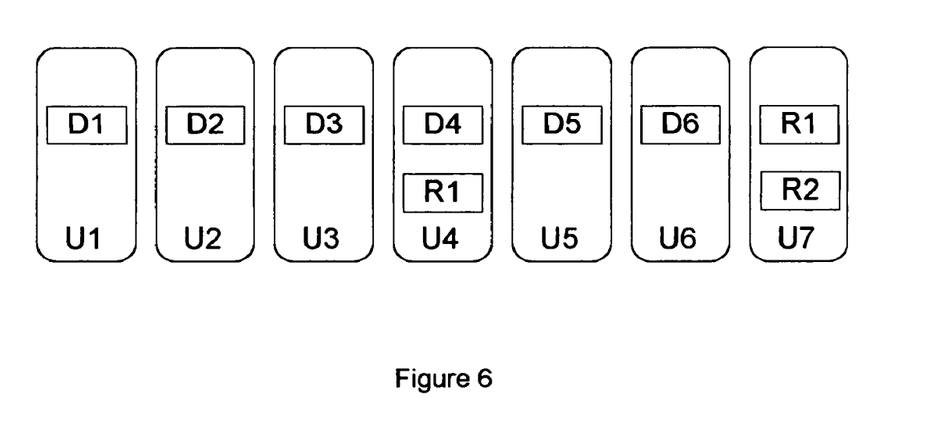
FIG. 6 illustrates a storage system with six data blocks on six storage units, two redundant blocks on a seventh storage unit, and a redundant block on the storage unit with the latest data update where the redundant blocks are used to reconstruct up to two failed data blocks per stripe or the redundant block on the latest data update is used to reconstruct a failed data block per stripe if the seventh storage unit is not available.

FIG. 6 illustrates a storage system with additional redundancy to protect against loss of a block when a storage unit with the two redundant blocks is unavailable. A copy of a redundant block is written on the storage unit with the most recent data block update. For example D4 is to be updated. D4 is read from U4. R1 and R2 are read from U7. R1 and R2 are processed as before to reflect new data for D4. New data D4 and R1 (or R2) are written to U4. R1 and R2 are written to U7. If U7 became unavailable, data blocks can be read from the other storage units. If a data block is not readable, the copy of R1 on U4 is used to reconstruct the data block. Even if the data block D4 were not readable, it can be reconstructed by reading D1, D2, D3, D5, D6, and copy of R1 The copy of R1 storage is not dedicated, as are all of the other blocks, since it is only used when the data block is the latest block written. When another data block is the latest block written, the disk block used for copy of R1 can be used for another stripe where the latest data block is written to U4. The storage for the copy of R1 reduces the data capacity to ⅚ of the previous capacity. If write access pattern is uniform, each storage unit will have 1/(N+1) or ⅐ of the latest block writes. About 1/(N+2) data capacity is reduced for storage of copy of R1. A table or other mechanism can be used to manage the blocks for copies of R1 on a storage unit. Each R1 block can be self-identifying and contain a counter or other mechanism to identify the latest block and the block group to which it belongs.

The self-identification is used when the table is not available. The characteristic of fast allocation and writing of R1 is important even if the rebuild process is slower since the probability of a failed drive and data block error is small. The copy of R1 on a data storage unit provides for the ability to recover from a failed storage unit and a failed data block. The copy of R1 can be used as a mechanism to recover from loss of a data block independent of the mechanism to protect against the loss of a storage unit. N blocks of data are stored on N storage units. A data protection mechanism generates a redundant block R1. The redundant block is stored on the storage unit with the most recent data block update. The redundant block is not stored on a failure independent storage unit. A data block update requires a two reads and one write:

The old data is read from the storage unit with the data block,

The old R1 is read from the storage unit with the previously most recent data update, (Note that this storage unit can now be released for other operations since the R1 block will be written to another storage unit.)

The effect of the old data is removed from R1 and the effect of the new data are added to R1, The new data and R1 are written to the storage unit with the most recent data block update.

The storage unit with the data block update is busy for a read operation followed by a two-block write operation. The storage unit with the most previous data block update is busy for a one block read operation. The R1 block is not stored on a failure independent storage unit. The loss of a storage unit may cause loss of data since the redundant information is stored with the data.

Second Stripe Structure within Storage Unit

The R1 redundant block can be stored with the data it protects if a failure only makes one block unavailable. A second stripe structure with the data blocks and redundant block can be written on the same storage unit. The management of the redundant storage block is simplified since the storage block is fixed in relationship to the data blocks. A data protection mechanism protects S blocks of data by generating a redundant block R1. The S blocks of data and the redundant block R1 are stored as a second stripe structure on a storage unit. If a block fails, the block can be reconstructed from the remaining blocks in the stripe. A data block can be updated with one read and one write. Read the old data and redundant block, remove the effect of the old data from the redundant block and add the effect of the new data to the redundant block, write the new data block and the redundant block. Note that the stripe is contained to a storage unit and the stripe cannot be used to protect against a storage unit failure.

If all blocks in a stripe are written at the same time, the update of a stripe requires only a write operation since all of the data blocks are updated and the redundant block is generated from all the data blocks. This mechanism may be used within a block where the block is divided into sub-blocks and a data recovery code is generated using the data sub-blocks to create a redundant sub-block for single sub-block recovery. The redundant sub-block is written with the data sub-blocks so a single write operation is required. S sub-block protection reduces the data sub-block capacity by $1/(S+1)$.

The first stripe structure was formed spanning failure independent storage units to protect against storage unit failure. The first stripe structure is independent of the second stripe structure within the storage unit. Each storage block is an element of a first stripe and a second stripe. If a block cannot be reconstructed using the first stripe structure, the second stripe structure may provide the means to reconstruct the block.

Figure 7:
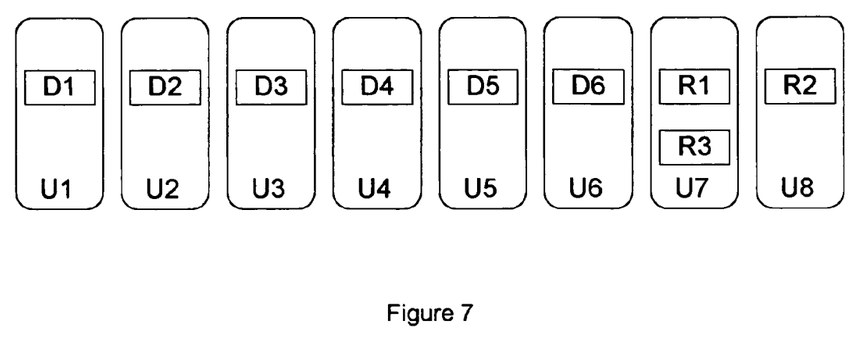
FIG. 7 illustrates a storage system with six data blocks on six storage units, two redundant blocks on a seventh storage unit and a third redundant block on an eighth storage unit where the redundant blocks are used to reconstruct up to three failed data blocks per stripe or reconstruct two storage units.

These data protection mechanisms may be combined to protect against the likely failure conditions. FIG. 7 illustrates a storage system that provides data recovery from three failed data blocks or two failed storage units. A data block update requires three reads and three writes. Data block D1 is stored on storage unit U1, D2 on U2, etc. Redundant blocks R1, R2, and R3 are generated from data blocks D1, D2, D3, D4, D5, and D6, such that all of the blocks may be regenerated when up to three blocks have failed. Redundant blocks R1 and R3 are stored on U7 and redundant block R2 is stored on U8. Updating a data block requires three read operations and three write operations.

The impact of a storage unit failure is not symmetric. Loss of U7 reduces the block recovery to an additional single block or the storage unit recovery to an additional storage unit. Loss of U8 reduces the block recovery to two additional blocks or the storage recovery to two additional storage units or recovery from the loss of U7.

In the unlikely event that two storage units fail, the remaining data blocks have no redundancy and are exposed to a failure. If the redundancy storage requirement is rotated among the storage units, $1/(N+2)$, or ⅛ (for N=6) of the data are exposed.

Figure 8:
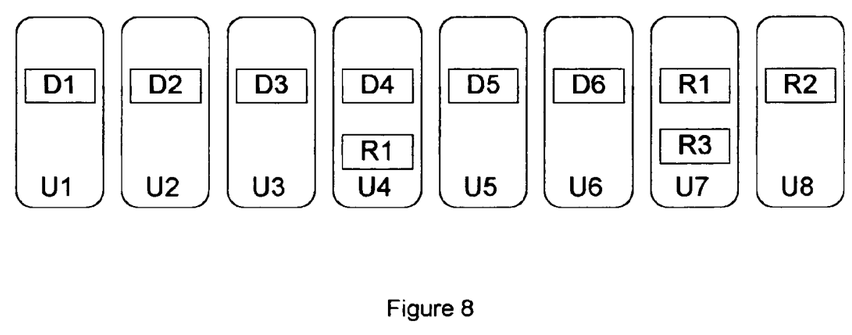
FIG. 8 illustrates a storage system with six data blocks on six storage units, two redundant blocks on a seventh storage unit, a third redundant block on an eighth storage unit, and a redundant block on the storage unit with the latest data update where the redundant blocks are used to reconstruct up to three failed data blocks per stripe or reconstruct two storage units or the redundant block on the storage unit with latest data update is used to reconstruct a data block per stripe if both the seventh storage unit and eighth storage units are not available.

FIG. 8 illustrates a storage system with an additional redundant block and recovery capability should both redundant blocks not be available. A copy of a redundant block R1 (or R2 or R3) is stored on the storage unit with the most recent data block update. For example, data block D4 is to be updated. Data block D4 is read from U4, redundant blocks R1 and R3 are read from U7, and redundant block R2 is read from U8. D4 is removed from R1, R2, and R3 and the new D4 is added to R1, R2, and R3. D4 and R1 are written to U4, R1 and R3 are written to U7, and R2 is written to U8. A data block update requires three reads and three writes. In the event that R1, R2, and R3 are not available, the copy of R1 is used to reconstruct a failed data block. The storage block for the copy of R1 is not dedicated since only the storage unit with the most recent data block update has the copy. If the block update distribution is uniform, each storage unit requires about $1/(N+2)$ additional capacity or the equivalent of another storage unit.

The storage systems illustrated in FIGS. 5, 6, 7, and 8 combine two concepts:
1. Store multiple redundant blocks on a storage unit to reduce the read and write operations.
2. Store copy of a redundant block with the latest data block update to provide added error recovery capability without significant write operation penalty.

Figure 9:
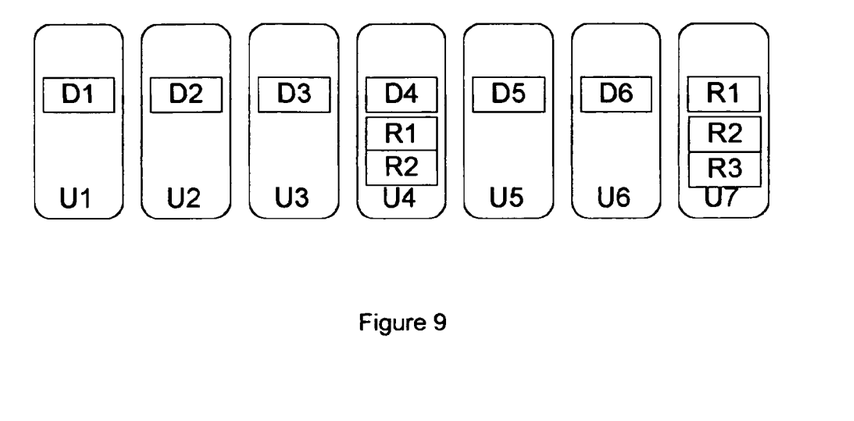
FIG. 9 illustrates a storage system with six data blocks on six storage units, three redundant blocks on a seventh storage unit, and two redundant blocks on the storage unit with the latest data update where the redundant blocks are used to reconstruct up to three failed data blocks per stripe or reconstruct one storage unit or the redundant blocks on the latest data update is used to reconstruct two data blocks per stripe if the seventh storage unit is not available.
Figure 10:
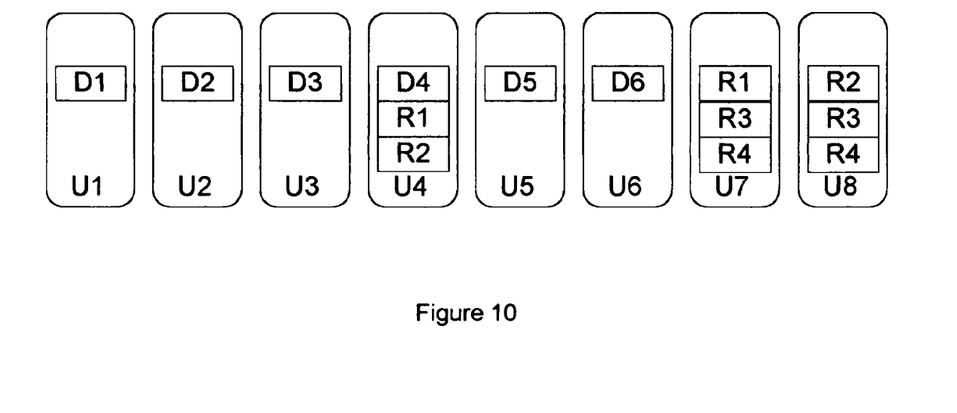
FIG. 10 illustrates a storage system with six data blocks on six storage units, two redundant blocks on a seventh storage unit, a third and fourth redundant blocks on an eighth storage unit, and two redundant blocks on the storage unit with the latest data update where the redundant blocks are used to reconstruct up to four failed data blocks or reconstruct two storage units or the two redundant blocks on the storage unit with latest data update are used to reconstruct up to two data blocks if both the seventh storage unit and eighth storage units are not available.

These concepts are extended in the storage systems illustrated in FIGS. 9 and 10. FIG. 9 illustrates a storage system that provides data recovery with the loss of three data blocks or two data blocks and the loss of a storage unit. Redundant blocks R1, R2, and R3 are generated from the data block such that any three blocks can be reconstructed from the remaining blocks. Redundant blocks R1, R2, and R3 are stored on U7. Copies of R1 and R2 are stored on the storage unit with the latest update, D4 on U4. In the event of the loss of U7, the copies of R1 and R2 can be used to reconstruct up to two failed data blocks. The data block update requires two reads and two writes. Five blocks of redundancy are required to protect N blocks of data.

FIG. 10 illustrates a storage system that provides data recovery with the loss of four data blocks or three blocks of data and the loss of one storage unit or two data blocks and the loss of two storage units. Redundant blocks R1, R2, R3 and R4 are generated from the data block such that any four blocks can be reconstructed from the remaining blocks. Redundant blocks R1, R3, and R4 are stored on U7. Redundant blocks R2, R3, and R4 are stored on U8. Copies of R1 and R2 are stored on the storage unit with the latest update, D4 on U4. In the event of the loss of U7 and U8, the copies of R1 and R2 can be used to reconstruct up to two failed data blocks. The data block update requires three reads and three writes. Eight blocks of redundancy are required to protect N blocks of data.

The stripes to protect against storage unit failures span the storage units. That is, each data block is on a different storage unit and the redundant block is on a different storage unit such that one storage unit failure will cause the loss of only one block in a stripe. A storage unit failure can be recovered by reconstructing each stripe to recover the blocks on the failed storage unit. A stripe within a storage unit cannot protect against a storage unit failure. However, a stripe within a storage unit can protect against a block failure for causes other than failure of the storage unit. The stripe within a storage unit provides for the update of a block with only operations on the storage unit with the block to be updated. A block requires Read the old block data and redundant block for the stripe in the storage unit from the storage unit with the block to be updated, Read the redundant block for the stripe across the storage units from the storage unit with the redundant block, Remove the effect of the old block data from the redundant blocks and add the effect of the new data to the redundant blocks, Write the new block data and the redundant block for the stripe in the storage unit Write the redundant block for the stripe across the storage units.

The advantage of the stripe within the storage unit is that protection against multiple block failures is provided without increasing the redundancy requirement for the stripe across the storage units.

The redundant blocks stored on the data block storage unit can be a combination of copies of the redundant blocks to protect against storage unit failures and redundant blocks to protect against block failures within a storage unit.

Storage capacities continue to increase. The cost of storage continues to decrease. More data are stored per storage unit. Failure rate of storage units continues to decrease. However, the error rates due to surface defects and bit size may increase. Even if the error rates are constant, the increase in capacity and data rate implies that the absolute number of errors increases. The disclosed mechanisms trade capacity for error recovery capability while minimizing the impact to the read and write operations required to update data blocks.

DESCRIPTION OF A PREFERRED EMBODIMENT

A storage system consists of a storage controller and a set of attached storage units. The storage system may connect to a processor unit with storage interface such as SCSI (Small Computer Storage Interface), ESCON (IBM Enterprise System Connection Architecture), or a variety of standard storage system interfaces. The storage controller may be implemented from a PC or workstation with a storage controller application program or specialized hardware to perform the storage controller functions with a commercial microprocessor from Intel, IBM, AMD, etc. with storage controller application or other hardware and processor to perform these functions. The storage units may be disk drives from Seagate, Hitachi, Maxtor, or other commercial disk drive provider. The storage units may be other storage devices such as Read/Write DVD or CD drives, semiconductor memories, or other storage devices that store data.

The storage system illustrated in FIG. 5 may be implemented with seven storage units. The block format for the storage units are illustrated in Table 1.

TABLE 1

Block Format To Recover Data From Two Block Failures Or One Storage Unit Failure

| U1 | U2 | U3 | U4 | U5 | U6 | U7 |
|----|----|----|----|----|----|----|
| 01 1D1 | 02 1D2 | 03 1D3 | 04 1D4 | 05 1D5 | 06 1D6 | 1R1 |
| 08 2D2 | 09 2D3 | 10 2D4 | 11 2D5 | 12 2D6 | 2R1 | 1R2 |
| 15 3D3 | 16 3D4 | 17 3D5 | 18 3D6 | 3R1 | 2R2 | 07 2D1 |
| 22 4D4 | 23 4D5 | 24 4D6 | 4R1 | 3R2 | 13 3D1 | 14 3D2 |
| 29 5D5 | 30 5D6 | 5R1 | 4R2 | 19 4D1 | 20 4D2 | 21 4D3 |
| 36 6D6 | 6R1 | 5R2 | 25 5D1 | 26 5D2 | 27 5D3 | 28 5D4 |
| 7R1 | 6R2 | 31 6D1 | 32 6D2 | 33 6D3 | 34 6D4 | 35 6D5 |
| 7R2 | 37 7D1 | 38 7D2 | 39 7D3 | 40 7D4 | 41 7D5 | 42 7D6 |

Table 1 illustrates the block format for storage units U1, U2, U3, U4, U5, U6, and U7. The set of six data blocks 1D1, 1D2, 1D3, 1D4, 1D5, and 1D6 generate the redundant blocks 1R1 and 1R2 such that any two blocks may fail and all blocks can be recovered from the remaining blocks in the stripe. These eight blocks form a stripe. Let N represent the number of data blocks in a stripe, H the number of storage units for data capacity, M represents the number of redundant blocks in the stripe and the maximum number of blocks that can be regenerated, and J the number of storage units for redundant block capacity and the maximum number of storage units that can be regenerated. Table 1 illustrates a storage system for N=6, M=2, H=6, and J=1. Similarly for the set of blocks 2Dx (x=1 to 6) generate 2R1 & 2R2, etc forming a second stripe. Block 1D1 has the storage system block address 01; block 1D2 has the system address 02, etc. Note that the storage system address assignment to data block is arbitrary and any one-to-one mapping of storage system address to data blocks can be made. The redundant blocks do not have a storage system address since these are not addressable as data in the storage system. Rotating the block pattern among the storage units balances the block requirements for each storage unit.

The rotation of the block pattern also may balance the accesses to the storage units for updating the redundant blocks as disclosed by Clarke, et al. The redundant blocks may be generated using an algebraic error correction code such as the b-adjacent code disclosed by Patel. The code may be implemented using code in the microprocessor or may have dedicated hardware to perform the field calculations to generate the redundant blocks for writing and updating data blocks and generate the failed blocks for recovering data as disclosed by Blaum and Ouchi.

The storage system illustrated in FIG. 6 may be implemented with 7 storage units. Table 2 illustrates the block format for the storage units.

TABLE 2

Block Format To Recover Data From Two Block Failures
Or One Storage Unit Failure And One Block Failure.

| U1 | U2 | U3 | U4 | U5 | U6 | U7 |
|----|----|----|----|----|----|----|
| 01 1D1 | 02 1D2 | 03 1D3 | 04 1D4 | 05 1D5 | 06 1D6 | 1R1 |
| 08 2D2 | 09 2D3 | 10 2D4 | 11 2D5 | 12 2D6 | 2R1 | 1R2 |
| 15 3D3 | 16 3D4 | 17 3D5 | 18 3D6 | 3R1 | 2R2 | XR1 |
| 22 4D4 | 23 4D5 | 24 4D6 | 4R1 | 3R2 | XR1 | 07 2D1 |
| 29 5D5 | 30 5D6 | 5R1 | 4R2 | XR1 | 13 3D1 | 14 3D2 |
| 36 6D6 | 6R1 | 5R2 | XR1 | 19 4D1 | 20 4D2 | 21 4D3 |
| 7R1 | 6R2 | XR1 | 25 5D1 | 26 5D2 | 27 5D3 | 28 5D4 |
| 7R2 | XR1 | 31 6D1 | 32 6D2 | 33 6D3 | 34 6D4 | 35 6D5 |
| XR1 | 37 7D1 | 38 7D2 | 39 7D3 | 40 7D4 | 41 7D5 | 42 7D6 |

Table 2 illustrates the block format for storage units U1, U2, U3, U4, U5, U6, and U7. The set of six data blocks 1D1, 1D2, 1D3, 1D4, 1D5, and 1D6 generate the redundant blocks 1R1 and 1R2 such that any two blocks may fail and all blocks can be recovered from the remaining blocks in the stripe. The storage system illustrated in Table 2 has N=6, H=6, M=2, and J=1. The additional capability to correct failed blocks when J storage units fail is represented by L. For this storage system configuration one block per stripe, L=1, can be recovered when one (J=1) storage unit fails. Similarly for set 2Dx (x=1 to 6) generate 2R1 & 2R2, etc. as a second stripe. Block 1D1 has the storage system block address 01; block 1D2 has the system address 02, etc. The redundant blocks do not have a storage system address since these are not addressable as data in the storage system.

Block XR1 represents the copy of the R1 block for a data group where the data block on the unit was the most recent block in the group to be updated. For example, when data block 1D4 is updated on U4, the XR1 block on U4 is written with the value for 1R1, the R1 block associated with stripe containing 1D4. When data block is updated on another storage unit, for example, 1D1 is updated on U1, the XR1 block on U1 is written with the value of the updated 1R1. The XR1 block on U4 may be used for another stripe or when the 1D4 block is updated again. The XR1 has information identifying use of the XR1 block since the previously used XR1 blocks are not updated to indicate that another XR1 has the current copy of R1 and this XR1 storage block can be used for another copy of a redundant block. The storage controller keeps a table of each stripe and the latest updated XR1 block. The table has one byte per stripe indicating the storage unit with the updated data block and the XR1 block used for the R1 block. For a storage systems with 4K byte blocks and N=6, each stripe contains 24K bytes. A megabyte table can manage a million stripes or a 24-gigabyte array. For N=14, a stripe contains 56 K bytes and megabyte table can manage a 56 gigabyte array. A terabyte array may need a table in the 20-megabyte to 40-megabyte range depending on the stripe capacity. The table can be kept in virtual storage where the XR1 identifier bytes for the active stripes are kept in real storage and the information for inactive stripes in the storage system. If the table is lost, information stored in the XR1 block is used to recover the table by reading all the XR1 blocks. From the table of latest updated XR1 blocks, the storage controller determines which XR1 block is not used and assigns the R1 copy for the stripe to the unused XR1 block. When the data block is written, the XR1 block is also written. The average read and write time for a data block is composed of the actuator seek time, rotation time for the data block to arrive at the read/write head, reading the block, rotation time for the data block to arrive again at the read/write head, and writing the data block. The average time for these operations is the sum of: average seek time plus ½ rotation time (for the block to arrive at the read/write head) plus 1 rotation (for reading the block and for the block to arrive again at the read/write head) plus the block write time. The additional average time to write the XR1 block is the time it takes to read the data block, read the old R1 block, and generate the R1 block. The XR1 block is between the reading of the data block and the writing of the data block since the entire track rotates under the read/write head. However, the XR1 write operation cannot start until the XR1 block is generated. The average difference between the rotation time for the data block and the old R1 block is ⅓ rotation unless the disk drives are synchronized. If the disk drives are synchronized, the difference in time between the data block and the R1 block is essentially zero. If the R1 generation time is short compared to the mechanical motion, the average time to generate the XR1 is ⅓ rotation. The probability that the XR1 record will pass under the read/write head before the XR1 record is generated and require additional time to wait for the XR1 block to rotate under the read/write head is average time to generate the XR1 record divided by the rotation time. The average time to wait is ½ rotation. Thus, the average added time is probability of requiring ½ rotation times the rotation time, which is ½ average time to generate XR1 or ⅙ rotation. The total average time to update the data block alone is the average seek time plus 1½ rotations. The additional time for the writing of the XR1 block is ⅙ rotation. With the XR1 block the average block update time is the average seek time plus 1⅔ rotation. If the disk drives are synchronized, the added time is essentially zero and there is no significant time penalty to write the XR1 record. On average, 1/N XR1 blocks are used on a storage unit. However, the use may not be evenly distributed by track. The XR1 block on other tracks may be used. A small additional number of XR1 blocks may be allocated for a storage unit. The XR1 block on a second storage unit may be used if all the XR1 blocks on a storage unit are used. When the storage unit with the R1 block is not available, the L redundant XR1 blocks on the storage unit that made the most recent data block update, is used to reconstruct up to L blocks that fail.

If a failure affects only the loss of one block, the redundant information can be stored with the data blocks. FIG. 3 illustrates the storage unit block format where the R1 block is stored with the most recent data block update.

TABLE 3

Block Format To Recover Data From One Block Failure.

| U1 | U2 | U3 | U4 | U5 | U6 |
|----|----|----|----|----|----|
| 01 1D1 | 02 1D2 | 03 1D3 | 04 1D4 | 05 1D5 | 06 1D6 |
| 07 2D1 | 08 2D2 | 09 2D3 | 10 2D4 | 11 2D5 | 12 2D6 |
| 13 3D1 | 14 3D2 | 15 3D3 | 16 3D4 | 17 3D5 | 18 3D6 |
| 19 4D1 | 20 4D2 | 21 4D3 | 22 4D4 | 23 4D5 | 24 4D6 |
| 25 5D1 | 26 5D2 | 27 5D3 | 28 5D4 | 29 5D5 | 30 5D6 |
| 31 6D1 | 32 6D2 | 33 6D3 | 34 6D4 | 35 6D5 | 36 6D6 |
| XR1 | XR1 | XR1 | XR1 | XR1 | XR1 |

Table 3 illustrates the block format for storage units U1, U2, U3, U4, U5, and U6. The set of six data blocks 1D1, 1D2, 1D3, 1D4, 1D5, and 1D6 generate the redundant block 1R1 such that any block may fail and all blocks can be recovered from the remaining blocks in the stripe. For the storage system illustrated in Table 3, N=6, H=6, M=1, J=0, and L=1. Similarly for set 2Dx (x=1 to 6) generate 2R1. Block 1D1 has the storage system block address 01; block 1D2 has the system address 02, etc. The redundant blocks do not have a storage system address since these are not addressable as data in the storage system. The redundant block is stored on the storage unit with the most data block update in the XR1 block on the storage unit. The XR1 blocks are managed as described for Table 2.

If a failure only affects the loss of one block, the redundant information can be stored with the data blocks. FIG. 4 illustrates the storage unit block format where the R1 block is stored with the protected data blocks.

TABLE 4

Block Format To Recover Data From One Block Failure.

| U1 | U2 | U3 | U4 | U5 | U6 |
|----|----|----|----|----|----|
| 01 1D1 | 07 2D1 | 13 3D1 | 19 4D1 | 25 5D1 | 31 6D1 |
| 02 1D2 | 08 2D2 | 14 3D2 | 20 4D2 | 26 5D2 | 32 6D2 |
| 03 1D3 | 09 2D3 | 15 3D3 | 21 4D3 | 27 5D3 | 33 6D3 |
| 04 1D4 | 10 2D4 | 16 3D4 | 22 4D4 | 28 5D4 | 34 6D4 |
| 05 1D5 | 11 2D5 | 17 3D5 | 23 4D5 | 29 5D5 | 35 6D5 |
| 06 1D6 | 12 2D6 | 18 3D6 | 24 4D6 | 30 5D6 | 36 6D6 |
| 1R1 | 2R1 | 3R1 | 4R1 | 5R1 | 6R1 |

Table 4 illustrates the block format for storage units U1, U2, U3, U4, U5, and U6. The set of six data blocks 1D1, 1D2, 1D3, 1D4, 1D5, and 1D6 generate the redundant block 1R1 such that any block may fail and all blocks can be recovered from the remaining blocks in the stripe. For the storage system illustrated in Table 4, N=6, H=6, M=1, J=0, and L=1. Similarly for set 2Dx (x=1 to 6) generate 2R1. Block 1D1 has the storage system block address 01; block 1D2 has the system address 02, etc. The redundant blocks do not have a storage system address since these are not addressable as data in the storage system. The redundant block is stored on the same storage unit as the data blocks. A data block update requires one read and one write. The old data block and the redundant block are read, the effect of the old data are removed from the redundant block and the effect of the new data are added to the redundant block, and the new data and redundant block are written. The loss of a storage unit can result in the loss of all of the data on the storage unit. If the data blocks are written together, the data blocks and the block may be written together in a single write operation without the requirement to read the old data block or redundant block.

The storage system illustrated in FIG. 7 may be implemented with eight storage units. The block format for the storage units are illustrated in Table 5.

TABLE 5

Block Format To Recover Data From Three Block Failures Or Two Storage Unit Failures

| U1 | U2 | U3 | U4 | U5 | U6 | U7 | U8 |
|----|----|----|----|----|----|----|----|
| 01 1D1 | 02 1D2 | 03 1D3 | 04 1D4 | 05 1D5 | 06 1D6 | 1R1 | 1R2 |
| 09 2D3 | 10 2D4 | 11 2D5 | 12 2D6 | 2R1 | 2R2 | 1R3 | 08 2D2 |
| 17 3D5 | 18 3D6 | 3R1 | 3R2 | 2R3 | 14 3D2 | 07 2D1 | 16 3D4 |
| 4R1 | 4R2 | 3R3 | 20 4D2 | 13 3D1 | 22 4D4 | 15 3D3 | 24 4D6 |
| 4R3 | 26 5D2 | 19 4D1 | 28 5D4 | 21 4D3 | 30 5D6 | 23 4D5 | 5R2 |
| 25 5D1 | 34 6D4 | 27 5D3 | 36 6D6 | 29 5D5 | 6R2 | 5R1 | 5R3 |
| 33 6D3 | 42 7D6 | 35 6D5 | 7R2 | 6R1 | 6R3 | 31 6D1 | 32 6D2 |
| 41 7D5 | 8R2 | 7R1 | 7R3 | 37 7D1 | 38 7D2 | 39 7D3 | 40 7D4 |
| 8R1 | 8R3 | 43 8D1 | 44 8D2 | 45 8D3 | 46 8D4 | 47 8D5 | 48 8D6 |

Table 5 illustrates the block format for storage units U1, U2, U3, U4, U5, U6, U7, and U8. The set of six data blocks 1D1, 1D2, 1D3, 1D4, 1D5, and 1D6 generate the redundant blocks 1R1, 1R2, and 1R3 and such that any three blocks may fail and all blocks can be recovered from the remaining blocks in the stripe. For the storage system illustrated in Table 5, N=6, H=6, M=3, J=2, and L=0. Similarly for set 2Dx (x=1 to 6) generate 2R1, 2R2, & 2R3, etc as a second stripe. Block 1D1 has the storage system block address 01; block 1D2 has the system address 02, etc. The redundant blocks do not have a storage system address since these are not addressable as data in the storage system. Rotating the block pattern among the storage units balances the block requirements for each storage unit. Note that the R3 block is assigned to the second redundant storage unit for the second half of the pattern.

The storage system illustrated in FIG. 8 may be implemented with eight storage units. The block format for the storage units are illustrated in Table 6.

TABLE 6

Block Format To Recover Data From Three Block Failures
Or One Block And Two Storage Unit Failures

| U1 | U2 | U3 | U4 | U5 | U6 | U7 | U8 |
|---|---|---|---|---|---|---|---|
| 01 1D1 | 02 1D2 | 03 1D3 | 04 1D4 | 05 1D5 | 06 1D6 | 1R1 | 1R2 |
| 09 2D3 | 10 2D4 | 11 2D5 | 12 2D6 | 2R1 | 2R2 | 1R3 | 08 2D2 |
| 17 3D5 | 18 3D6 | 3R1 | 3R2 | 2R3 | 14 3D2 | 07 2D1 | 16 3D4 |
| 4R1 | 4R2 | 3R3 | 20 4D2 | 13 3D1 | 22 4D4 | 15 3D3 | 24 4D6 |
| 4R3 | 26 5D2 | 19 4D1 | 28 5D4 | 21 4D3 | 30 5D6 | 23 4D5 | 5R2 |
| 25 5D1 | 34 6D4 | 27 5D3 | 36 6D6 | 29 5D5 | 6R2 | 5R1 | 5R3 |
| 33 6D3 | 42 7D6 | 35 6D5 | 7R2 | 6R1 | 6R3 | 31 6D1 | 32 6D2 |
| 41 7D5 | 8R2 | 7R1 | 7R3 | 37 7D1 | 38 7D2 | 39 7D3 | 40 7D4 |
| 8R1 | 8R3 | 43 8D1 | 44 8D2 | 45 8D3 | 46 8D4 | 47 8D5 | 48 8D6 |
| XR1 | XR1 | XR1 | XR1 | XR1 | XR1 | XR1 | XR1 |

Table 6 illustrates the block format for storage units U1, U2, U3, U4, U5, U6, U7, and U8. The set of six data blocks 1D1, 1D2, 1D3, 1D4, 1D5, and 1D6 generate the redundant blocks 1R1, 1R2, and 1R3 and such that any three blocks may fail and all blocks can be recovered from the remaining blocks in the stripe. A copy of 1R1 is written into a XR1 block on the storage unit with the latest data block update for the stripe. For the storage system illustrated in Table 6, N=6, H=6, M=3, J=2, and L=1. Similarly for set 2Dx (x=1 to 6) generate 2R1, 2R2, and 2R3, etc. A copy of 2R1 is written into a XR1 block on the storage unit with the latest data block update for the stripe. Block 1D1 has the storage system block address 01; block 1D2 has the system address 02, etc. The redundant blocks do not have a storage system address since these are not addressable as data in the storage system. Rotating the block pattern among the storage units balances the block requirements for each storage unit. Note that the R3 block is assigned to the second redundant storage unit for the second half of the pattern.

The storage system illustrated in FIG. 9 may be implemented with 7 storage units. Table 7 illustrates the block format for the storage units.

TABLE 7

Block Format To Recover Data From Three Block Failures
Or One Storage Unit Failure And Two Block Failures.

| U1 | U2 | U3 | U4 | U5 | U6 | U7 |
|---|---|---|---|---|---|---|
| 01 1D1 | 02 1D2 | 03 1D3 | 04 1D4 | 05 1D5 | 06 1D6 | 1R1 |
| 08 2D2 | 09 2D3 | 10 2D4 | 11 2D5 | 12 2D6 | 2R1 | 1R2 |
| 15 3D3 | 16 3D4 | 17 3D5 | 18 3D6 | 3R1 | 2R2 | 1R3 |
| 22 4D4 | 23 4D5 | 24 4D6 | 4R1 | 3R2 | 2R3 | 07 2D1 |
| 29 5D5 | 30 5D6 | 5R1 | 4R2 | 3R3 | 13 3D1 | 14 3D2 |
| 36 6D6 | 6R1 | 5R2 | 4R3 | 19 4D1 | 20 4D2 | 21 4D3 |
| 7R1 | 6R2 | 5R3 | 25 5D1 | 26 5D2 | 27 5D3 | 28 5D4 |
| 7R2 | 6R3 | 31 6D1 | 32 6D2 | 33 6D3 | 34 6D4 | 35 6D5 |
| 7R3 | 37 7D1 | 38 7D2 | 39 7D3 | 40 7D4 | 41 7D5 | 42 7D6 |
| XR1 | XR1 | XR1 | XR1 | XR1 | XR1 | XR1 |
| XR2 | XR2 | XR2 | XR2 | XR2 | XR2 | XR2 |

Table 7 illustrates the block format for storage units U1, U2, U3, U4, U5, U6, and U7. The set of six data blocks 1D1, 1D2, 1D3, 1D4, 1D5, and 1D6 generate the redundant blocks 1R1, 1R2, and 1R3 such that any three blocks may fail and all blocks can be recovered from the remaining blocks in the stripe. Copies of blocks 1R1 and 1R2 are stored in XR1 and XR2 blocks on the storage unit with the latest data block update for the stripe. For the storage system illustrated in Table 7, N=6, H=6, M=3, J=1, and L=2. Similarly for set 2Dx (x=1 to 6) generate 2R1 & 2R2, etc as a second stripe. Copies of blocks 2R1 and 2R2 stored in XR1 and XR2 blocks on the storage unit with the latest data block update for the stripe. Block 1D1 has the storage system block address 01; block 1D2 has the system address 02, etc. The redundant blocks do not have a storage system address since these are not addressable as data in the storage system.

The storage system illustrated in FIG. 10 may be implemented with eight storage units. The block format for the storage units are illustrated in Table 8.

TABLE 8

Block Format To Recover Data From Four Block Failures Or Two Blocks And Two Storage Unit Failures

| U1 | U2 | U3 | U4 | U5 | U6 | U7 | U8 |
|---|---|---|---|---|---|---|---|
| 01 1D1 | 02 1D2 | 03 1D3 | 04 1D4 | 05 1D5 | 06 1D6 | 1R1 | 1R2 |
| 09 2D3 | 10 2D4 | 11 2D5 | 12 2D6 | 2R1 | 2R2 | 1R3 | 1R3 |
| 17 3D5 | 18 3D6 | 3R1 | 3R2 | 2R3 | 2R3 | 1R4 | 1R4 |
| 4R1 | 4R2 | 3R3 | 3R3 | 2R4 | 2R4 | 07 2D1 | 08 2D2 |
| 4R3 | 4R3 | 3R4 | 3R4 | 13 3D1 | 14 3D2 | 15 3D3 | 16 3D4 |
| 4R4 | 4R4 | 19 4D1 | 20 4D2 | 21 4D3 | 22 4D4 | 23 4D5 | 24 4D6 |
| 25 5D1 | 26 5D2 | 27 5D3 | 28 5D4 | 29 5D5 | 30 5D6 | 5R1 | 5R2 |
| 33 6D3 | 34 6D4 | 35 6D5 | 36 6D6 | 6R1 | 6R2 | 5R3 | 5R3 |
| 41 7D5 | 42 7D6 | 7R1 | 7R2 | 6R3 | 6R3 | 5R4 | 5R4 |
| 8R1 | 8R2 | 7R3 | 7R3 | 6R4 | 6R4 | 31 6D1 | 32 6D2 |
| 8R3 | 8R3 | 7R4 | 7R4 | 37 7D1 | 38 7D2 | 39 7D3 | 40 7D4 |
| 8R4 | 8R4 | 43 8D1 | 44 8D2 | 45 8D3 | 46 8D4 | 47 8D5 | 48 8D6 |
| XR1 | XR1 | XR1 | XR1 | XR1 | XR1 | XR1 | XR1 |
| XR2 | XR2 | XR2 | XR2 | XR2 | XR2 | XR2 | XR2 |

Table 8 illustrates the block format for storage units U1, U2, U3, U4, U5, U6, U7, and U8. The set of six data blocks 1D1, 1D2, 1D3, 1D4, 1D5, and 1D6 generate the redundant blocks 1R1, 1R2, 1R3, and 1R4 and such that any four blocks may fail and all blocks can be recovered from the remaining blocks in the stripe. A copy of 1R1 and 2R1 are written into a set of XR1 and XR2 blocks on the storage unit with the latest data block update for the stripe. For the storage system illustrated in Table 8, N=6, H=6, M=4, J=2, and L=2. Similarly for set 2Dx (x=1 to 6) generate 2R1, 2R2, 2R3 and 2R4, etc as a second stripe. A copy of 2R1 and 2R2 are written into a set of XR1 and XR2 blocks on the storage unit with the latest data block update for the stripe. Block 1D1 has the storage system block address 01; block 1D2 has the system address 02, etc. The redundant blocks do not have a storage system address since these are not addressable as data in the storage system. Rotating the block pattern among the storage units balances the block requirements for each storage unit.

If a failure only affects the loss of one block, the redundant information can be stored with the data blocks. FIG. 9 illustrates the storage unit block format where the R1 block is stored with the protected data blocks and the reconstruction of a failed storage device is provided by the first stripe structure with redundant block.

TABLE 9

Block Format To Recover Data From One Block Failure and One Storage Unit Failure.

| U1 | U2 | U3 | U4 | U5 | U6 | U7 |
|---|---|---|---|---|---|---|
| 01 1D1 | 07 2D1 | 13 3D1 | 19 4D1 | 25 5D1 | 31 6D1 | YR1 |
| 02 1D2 | 08 2D2 | 14 3D2 | 20 4D2 | 26 5D2 | 32 6D2 | YR2 |
| 03 1D3 | 09 2D3 | 15 3D3 | 21 4D3 | 27 5D3 | 33 6D3 | YR3 |
| 04 1D4 | 10 2D4 | 16 3D4 | 22 4D4 | 28 5D4 | 34 6D4 | YR4 |
| 05 1D5 | 11 2D5 | 17 3D5 | 23 4D5 | 29 5D5 | 35 6D5 | YR5 |
| 06 1D6 | 12 2D6 | 18 3D6 | 24 4D6 | 30 5D6 | 36 6D6 | YR6 |
| 1R1 | 2R1 | 3R1 | 4R1 | 5R1 | 6R1 | 7R1 |

Table 9 illustrates the block format for storage units U1, U2, U3, U4, U5, U6, and U7. A first set of six data blocks 1D1, 2D1, 3D1, 4D1, 5D1, 6D1 generate the redundant block YR1 such that any block may fail and all blocks may be recovered from the remaining blocks in the stripe. This first stripe structure is across the storage units and protects against the loss of a block or a storage device. The second set of six data blocks 1D1, 1D2, 1D3, 1D4, 1D5, and 1D6 generate the redundant block 1R1 such that any block may fail and all blocks can be recovered from the remaining blocks in the stripe. The second stripe structure within a storage unit and only protects against the loss of a block within the storage unit. Each block is a member of two stripes where one stripe is within a storage unit and one stripe is across the storage units. Block 1D1 is a member of both described stripes. All other members of the first stripe are NOT members of this second stripe but each are members of different second stripe structure stripes. The two stripe structures form a two dimensional array where each storage unit is a member of a unique pair of stripes, one in each dimension. Note that the error correction code that generates 1R1 may different than the error correction code for YR1 and that the number of blocks to generate 1R1 may be different from the number of blocks to generate YR1. The example illustrates error codes that generate one redundant block per error correction code. Error correction codes that generate multiple redundant blocks may be used. The number of redundant blocks need not be equal for the two strip structures (dimensions). The example illustrated in Table 10, the code to protect blocks within a storage device generates two redundant blocks to protect against two block failures and the code to protect against storage unit failures generates one redundant block to protect against single storage unit failures.

Let S represent the number of information blocks in a stripe within a storage unit and R represent the number of redundant blocks generated by the S information blocks such that up to R blocks may be regenerated from the remaining blocks of the stripe. For the storage system illustrated in Table 9, N=6, H=6, M=1, J=1, S=6, and R=1. Similarly for set 2Dx (x=1 to 6) generate 2R1 for the first stripe structure and the set yD2 (y=1 to 6) generate YR2 for the second strip structure. Block 1D1 has the storage system block address 01; block 1D2 has the system address 02, etc. The redundant blocks do not have a storage system address since these are not addressable as data in the storage system. The xR1 redundant block is stored on the same storage unit as the data blocks. The YRx redundant block is stored on a storage device that does not have a data block for the stripe. A data block update requires two reads and two writes.

The old data block and the redundant block xR1 are read from the data the storage unit, The redundant block YRx is read from the storage unit with the redundant block for the stripe.

Effect of the old data are removed from the redundant block sand the effect of the new data are added to the redundant blocks, The new data and xR1 redundant block are written to the data storage unit and The YRx redundant block is written to the storage unit with the redundant block.

A storage unit failure or block failure is recovered using the YRx redundant block and the remaining yDx data blocks. A block failure is recovered using the xR1 redundant block and the remaining yDx data blocks in the stripe on the storage unit.

TABLE 10

Block Format To Recover Data From Two Block Failures and One Storage Unit Failure.

| U1 | U2 | U3 | U4 | U5 | U6 | U7 |
|---|---|---|---|---|---|---|
| 01 1D1 | 07 2D1 | 13 3D1 | 19 4D1 | 25 5D1 | 31 6D1 | YR1 |
| YR2 | 02 1D2 | 08 2D2 | 14 3D2 | 20 4D2 | 26 5D2 | 32 6D2 |
| 33 6D3 | YR3 | 03 1D3 | 09 2D3 | 15 3D3 | 21 4D3 | 27 5D3 |
| 28 5D4 | 34 6D4 | YR4 | 04 1D4 | 10 2D4 | 16 3D4 | 22 4D4 |
| 23 4D5 | 29 5D5 | 35 6D5 | YR5 | 05 1D5 | 11 2D5 | 17 3D5 |
| 18 3D6 | 24 4D6 | 30 5D6 | 36 6D6 | YR6 | 06 1D6 | 12 2D6 |
| 1R1 | 2R1 | 3R1 | 4R1 | 5R1 | 6R1 | 7R1 |
| 1R2 | 2R2 | 3R2 | 4R2 | 5R2 | 6R2 | 7R2 |

Table 10 illustrates the block format for storage units U1, U2, U3, U4, U5, U6, and U7. A first set of six data blocks 1D1, 2D1, 3D1, 4D1, 5D1, 6D1 generate the redundant block YR1 such that any block may fail and all blocks may be recovered from the remaining blocks in the stripe. This first stripe is across the storage units and protects against the loss of a block or a storage device. The second set of six data blocks 1D1, YR2, 6D3, 5D4, 4D5, and 3D6 generate the redundant blocks 1R1 and 1R2 such that any two blocks may fail and all blocks can be recovered from the remaining blocks in the stripe. This first second stripe is within a storage unit and only protects against the loss of blocks within the storage unit. Each block is a member of two stripes where one stripe is within a storage unit and one stripe is across the storage units. For the storage system illustrated in Table 10, N=6, H=6, M=1, J=1, S=6, and R=2. Similarly the set yD2 (y=1 to 6) generate YR2 and set 2D1, 1D2, YR3, 6D4, 5D5, and 4D6 generate 2R1 & 2R2. Block 1D1 has the storage system block address 01; block 1D2 has the system address 02, etc. The redundant blocks do not have a storage system address since these are not addressable as data in the storage system. The xR1 and xR2 redundant block is stored on the same storage unit as the data blocks. The YRx redundant block is stored on a storage device that does not have a data block for the stripe.

TABLE 11

Block Format To Recover Data From Two Block Failures and One Storage Unit Failure.

| U1 | U2 | U3 | U4 | U5 | U6 | U7 |
|---|---|---|---|---|---|---|
| 01 1D1 | 07 2D1 | 13 3D1 | 19 4D1 | 25 5D1 | 31 6D1 | YR1 |
| YR2 | 02 1D2 | 08 2D2 | 14 3D2 | 20 4D2 | 26 5D2 | 32 6D2 |
| 33 6D3 | YR3 | 03 1D3 | 09 2D3 | 15 3D3 | 21 4D3 | 27 5D3 |

TABLE 11-continued

Block Format To Recover Data From Two Block
Failures and One Storage Unit Failure.

| U1 | U2 | U3 | U4 | U5 | U6 | U7 |
|----|----|----|----|----|----|----|
| 28 5D4 | 34 6D4 | YR4 | 04 1D4 | 10 2D4 | 16 3D4 | 22 4D4 |
| 23 4D5 | 29 5D5 | 35 6D5 | YR5 | 05 1D5 | 11 2D5 | 17 3D5 |
| 18 3D6 | 24 4D6 | 30 5D6 | 36 6D6 | YR6 | 06 1D6 | 12 2D6 |
| 1R1 | 2R1 | 3R1 | 4R1 | 5R1 | 6R1 | 7R1 |
| XR1 | XR1 | XR1 | XR1 | XR1 | XR1 | XR1 |

Table 11 illustrates the block format for storage units U1, U2, U3, U4, U5, U6, and U7. A first set of six data blocks 1D1, 2D1, 3D1, 4D1, 5D1, 6D1 generate the redundant block YR1 such that any block may fail and all blocks may be recovered from the remaining blocks in the stripe. This first stripe is across the storage units and protects against the loss of a block or a storage device. The second set of six data blocks 1D1, YR2, 6D3, 5D4, 4D5, and 3D6 generate the redundant block 1R1 such that any block may fail and all blocks can be recovered from the remaining blocks in the stripe. This second stripe is within a storage unit and only protects against the loss of blocks within the storage unit. Each block is a member of two stripes where one stripe is within a storage unit and one stripe is across the storage units. A copy of YR1 is written on the storage unit with the data block update. For the storage system illustrated in Table 11, N=6, H=6, M=1, J=1, L=1, S=6, and R=1. Similarly for set 2D1, 1D2, YR3, 6D4, 5D5, and 4D6 and the set yD2 (y=1 to 6) generate YR2. Block 1D1 has the storage system block address 01; block 1D2 has the system address 02, etc. The redundant blocks do not have a storage system address since these are not addressable as data in the storage system. The xR1 and XR1 redundant block is stored on the same storage unit as the data blocks. The YRx redundant block is stored on a storage device that does not have a data block for the stripe.

I claim:

1. A storage system with data recovery from M failed blocks per stripe or J failed storage units comprising N, N>0 data blocks stored on N storage units and a first error correction code that generates M, M>0 redundant blocks from the N data blocks where the N data blocks and M redundant blocks form a stripe, wherein the M redundant blocks are stored on J, J less than or equal to M but at least one additional storage units such that K failed data blocks, K less than or equal to M blocks are regenerated from the remaining N+M−K blocks of the stripe; or P storage units fail, P less than or equal to J containing data blocks wherein the data blocks in the failed storage units are regenerated from the remaining data blocks and remaining redundant blocks of the stripe.

2. The storage system of claim 1 wherein the storage for the redundant blocks is rotated among the N+J storage units such that the storage requirement is evenly distributed.

3. The storage system of claim 1 wherein the storage for the redundant blocks is rotated among the N+J storage units such that the storage accesses to the redundant blocks are uniformly distributed.

4. The storage system of claim 1 wherein the storage system provides additional data recovery from J failed storage units and L failed blocks per stripe wherein:

L, L less than or equal to M redundant blocks that are copies of the M redundant blocks of a stripe are stored on the storage unit with the most recent data block update for the stripe; and in the event of failure of storage units with the M redundant blocks, the L copies of the redundant blocks are used to reconstruct up to L failed blocks of the stripe.

5. The storage system of claim 1 wherein the storage system provides additional data recovery from J failed storage units and L failed data blocks per stripe wherein:

L, L less than or equal to M redundant blocks that are copies of the M redundant blocks of a stripe are stored on the storage unit with the most recent data block update for the stripe; and the storage blocks for the L copies of the redundant blocks are assigned as needed from a cool of storage blocks.

6. The storage system of claim 1 wherein the storage system provides additional data recovery from J failed storage units and L failed blocks in the stripe and R failed blocks for each stripe of a second stripe structure within each storage unit wherein:

L, L less than or equal to M redundant blocks are copies of the M redundant blocks of a stripe and are stored on the storage unit with the most recent data block update for the stripe; and grouping S, S>0 blocks stored on a storage unit including one block from the stripe, a second error correction code generates R redundant blocks from the S blocks and the R redundant blocks are stored on the storage unit to form a second stripe;

such that V failed data blocks, V less than or equal to R are regenerated from the remaining S+R−V blocks of the second stripe.

7. The storage system of claim 1 wherein the storage system provides additional data recovery from J failed storage units and R failed blocks for each stripe of a second stripe structure in each functioning storage unit where:

for S, S>0 blocks stored on a storage unit including one block from the stripe, a second error correction code generates R redundant blocks from the S blocks; and the R redundant blocks are stored on the storage unit to form a second stripe;

such that V failed data blocks, V less than or equal to R blocks are regenerated from the remaining S+R−V blocks of the second stripe.

8. A storage system with data recovery from L failed blocks per stripe comprising N, N>0 data blocks stored on H, H greater than or equal to N+1 storage units, one data block per storage unit, and a first error correction code that generates M, M>0 redundant blocks from the N data wherein:

the N data blocks and the M redundant blocks form a stripe such that K failed data blocks K less than or equal to M blocks are regenerated from the remaining N+M−K blocks of the stripe; and L, L less than or equal to M redundant blocks are stored on the storage unit with the most recent data block update;

such that when one or more of the M redundant blocks are not accessible, T, T less than or equal to L data blocks are regenerated from the remaining N+L−T blocks of the stripe.

9. The storage system of claim 8 wherein the storage blocks for the L redundant blocks are assigned as needed from a pool of storage blocks.

10. The storage system of claim 8 wherein the storage system provides additional data recovery from J failed storage units or M failed blocks per stripe wherein:

the number of data blocks, N, equals the number of storage units, H, each with a data block from the stripe; and the M redundant blocks for the stripe are stored on J, J less than or equal to M but at least one additional storage units;

such that P storage units fail, P less than or equal to J containing data blocks wherein the data blocks on the failed storage units are regenerated from the remaining data blocks and redundant blocks of the stripe.

11. The storage system of claim 8 wherein the storage system provides additional data recovery from J failed storage units or M failed blocks per stripe wherein the number of data blocks, N, equals the number of storage units, H, each storing a data block from the stripe, and the M redundant blocks for the stripe are stored on J, J less than or equal to M but at least one additional storage units and the storage requirement for the M redundant blocks is rotated among the H+J storage units so the storage requirement is equally distributed.

12. The storage system of claim 8 wherein the storage system provides additional data recovery from J failed storage units or M failed blocks per stripe wherein the number of data blocks, N, equals the number of storage units, H, each storing a data block from the stripe, and the M redundant blocks for the stripe are stored on J, J less than or equal to M but at least one additional storage units and the storage requirement for the M redundant blocks is rotated among the H+J storage units so the storage accesses to the redundant blocks are uniform.

13. The storage system of claim 8 wherein the storage system provides additional data recovery from J failed storage units and L failed blocks per stripe and R failed blocks per second stripe within a storage unit or M failed blocks per stripe and R failed blocks per second stripe within a storage unit wherein:

the number of data blocks, N, equals the number of storage units, H, each storing a data block from the stripe;

the M redundant blocks for the stripe are stored on J, J less than or equal to M but at least one additional storage units and for S, S>0 blocks stored on a storage unit including one block from the stripe, a second error correction code generates R redundant blocks from the S blocks and the R redundant blocks are stored on that storage unit;

such that V failed data blocks, V less than or equal to R are regenerated from the remaining S+R−V blocks of the second stripe.

14. A storage system with data recovery from R failed blocks per second stripe within a storage unit and J failed storage units or M failed blocks per first stripe across storage units and R failed blocks per second stripe within a storage unit comprising:

N, N>0 data blocks stored on N storage units; and a first error correction code that generates M, M>0 redundant blocks from the N data blocks wherein the N data blocks and M redundant blocks form a first stripe across storage units such that K failed data blocks, K less than or equal to M are regenerated from the remaining N+M−K blocks of the first stripe; and the M redundant blocks are stored on J, J less than or equal to M but at least one additional storage units; and S, S>0 blocks stored on a storage unit including one block from the first stripe and a second error correction code that generates R, R>0 blocks from the S data blocks wherein the S blocks and R redundant blocks form a second stripe stored within the storage unit such that V failed data blocks, V less than or equal to R blocks are regenerated from the remaining S+R−V blocks of the second stripe;

such that the storage system can regenerate R blocks of failed data blocks for an S data blocks stripe within a storage unit and regenerate either data blocks for J failed storage units or M failed data blocks per N data block stripe across the storage units.

15. The storage system of claim 14 wherein the storage requirement for the M redundant blocks is rotated among the N+J storage units so that the storage requirement is evenly distributed.

16. The storage system of claim 14 wherein the storage requirement for the M redundant blocks is rotated among the N+J storage units so that the storage accesses to the redundant blocks are uniformly distributed.

17. The storage system of claim 14 wherein L, L less than or equal to M redundant blocks are L copies of the M redundant blocks are stored on the storage unit with the most recent data block update and the storage system provides additional data recovery from R failed blocks per second stripe and L failed blocks per first stripe across the storage units and J failed storage units.

18. The storage system of claim 14 wherein L, L less than or equal to M redundant blocks are L copies of the M redundant blocks are stored on the storage unit with the most recent data block update and the storage system provides additional data recovery from R failed blocks per second stripe and L failed blocks per first stripe across the storage units and J failed storage units wherein the storage blocks for the L redundant blocks are assigned on demand from a pool of storage blocks.

* * * * *